United States Patent [19]

Schnell

[11] 4,094,548
[45] June 13, 1978

[54] APPARATUS FOR CONVEYING AND SEPARATING LOOSE MATERIAL

[75] Inventor: Ludwig Lorenz Schnell, Aufhausen, Germany

[73] Assignee: Schuttgutfordertechnik AG, Zug, Switzerland

[21] Appl. No.: 706,653

[22] Filed: Jul. 19, 1976

Related U.S. Application Data

[63] Continuation of Ser. No. 521,461, Nov. 6, 1974, abandoned.

[30] Foreign Application Priority Data

Nov. 8, 1973 Germany .............................. 2355831

[51] Int. Cl.² .......................... E02F 3/88; E02F 7/00
[52] U.S. Cl. .......................................... 299/9; 37/58;
37/72; 138/114; 242/86.5 R; 277/3; 277/15;
277/91; 277/212 R; 285/11; 285/302
[58] Field of Search ................................ 37/58, 61–63,
37/64–67, 72; 302/64, 14, 15; 138/114, 178,
111, 117, 155, 157; 277/59, 70, 3, 15, 91, 93 R,
212; 285/106, 302, 96; 299/8, 9

[56] References Cited

U.S. PATENT DOCUMENTS

| 716,173 | 12/1902 | Bates | 37/65 |
|---|---|---|---|
| 925,079 | 6/1909 | Carlesimo | 37/58 |
| 2,801,479 | 8/1957 | Braver | 37/66 UX |
| 3,153,451 | 10/1964 | Chancellor et al. | 277/212 X |
| 3,353,851 | 11/1967 | Vincent | 285/302 |
| 3,429,588 | 2/1969 | Nelson | 285/96 X |
| 3,443,845 | 5/1969 | Walchle et al. | 277/212 X |
| 3,748,760 | 7/1973 | Schnell | 37/58 |

Primary Examiner—Clifford D. Crowder
Attorney, Agent, or Firm—Michael J. Striker

[57] ABSTRACT

Conveying apparatus for sand, gravel and the like comprises a conveying head at the lower end of a lower pipe portion sealed to and displaceable telescopically relative to an upper pipe portion which is not longitudinally displaceable. An annular interspace between the pipe portions is filled with a pressurized sealing medium. The upper end of the upper pipe portion discharges via an impingement head into a horizontal classifying drum.

25 Claims, 10 Drawing Figures

APPARATUS FOR CONVEYING AND SEPARATING LOOSE MATERIAL

This is a continuation of application Ser. No. 521,461, filed Nov. 6, 1974, now abandoned.

This invention relates to an apparatus for conveying loose material, especially sand and gravel.

In known apparatus for conveying loose material, for example in dredgers for conveying sand and gravel from rivers and lakes, it is difficult to adjust the conveyor line with its associated conveyor head to the correct conveyor depth. The water depth in a lake or river can be very variable, so that during conveying it is often necessary to modify the depth adjustment of the conveyor head. In traditional dredgers with rigid conveyor pipes this can be done essentially in two different ways.

According to one known method, the complete rigid pipe is lifted or lowered. By this means the upper end of the conveyor pipe juts out to a greater or lesser distance vertically above the water surface. It is difficult thereby to make a vertical displacement of a rigid pipe of more than about 8 m. Furthermore, it is difficult to convey the loose material away from the upper end of the conveyor line, as a flexible coupling between the conveyor pipe and a collecting vessel for the loose material must be provided. Finally, conveying through a conveyor pipe which terminates several meters above the water surface can be attained only with very high pressure.

A second method for varying the effective depth position of the conveyor head comprises supporting the conveyor pipe, approximately at the level of the water surface, in a pivotable manner, and pivoting it into a sloping position, for example with the help of rope winches. This is only possible, however, within a small angular range, because otherwise the conveyor head fixed to the lower conveyor pipe end will be swung out of its optimum working position and its conveying capacity will fall. Therefore the depth range through which the conveyor head may be varied is substantially restricted.

The object of the invention is to overcome these disadvantages and make the working depth variable over a substantially larger range than previously while supporting the upper conveyor pipe end in a substantially stationary manner, without thereby changing the optimum working position of the conveyor head.

This is attained according to the invention, in that the conveyor line is supported at its upper end in a longitudinally undisplaceable manner and consists of at least two pipe portions fluid-tightly telescopically received one in the other, and the interspace between the pipe portions is filled with a pressurised sealing medium, preferably a pressurized water, to prevent penetration of impurities between the pipe portions.

A preferred embodiment of the invention is described in greater detail hereinafter with reference to the accompanying drawing, in which.

Figure 1:
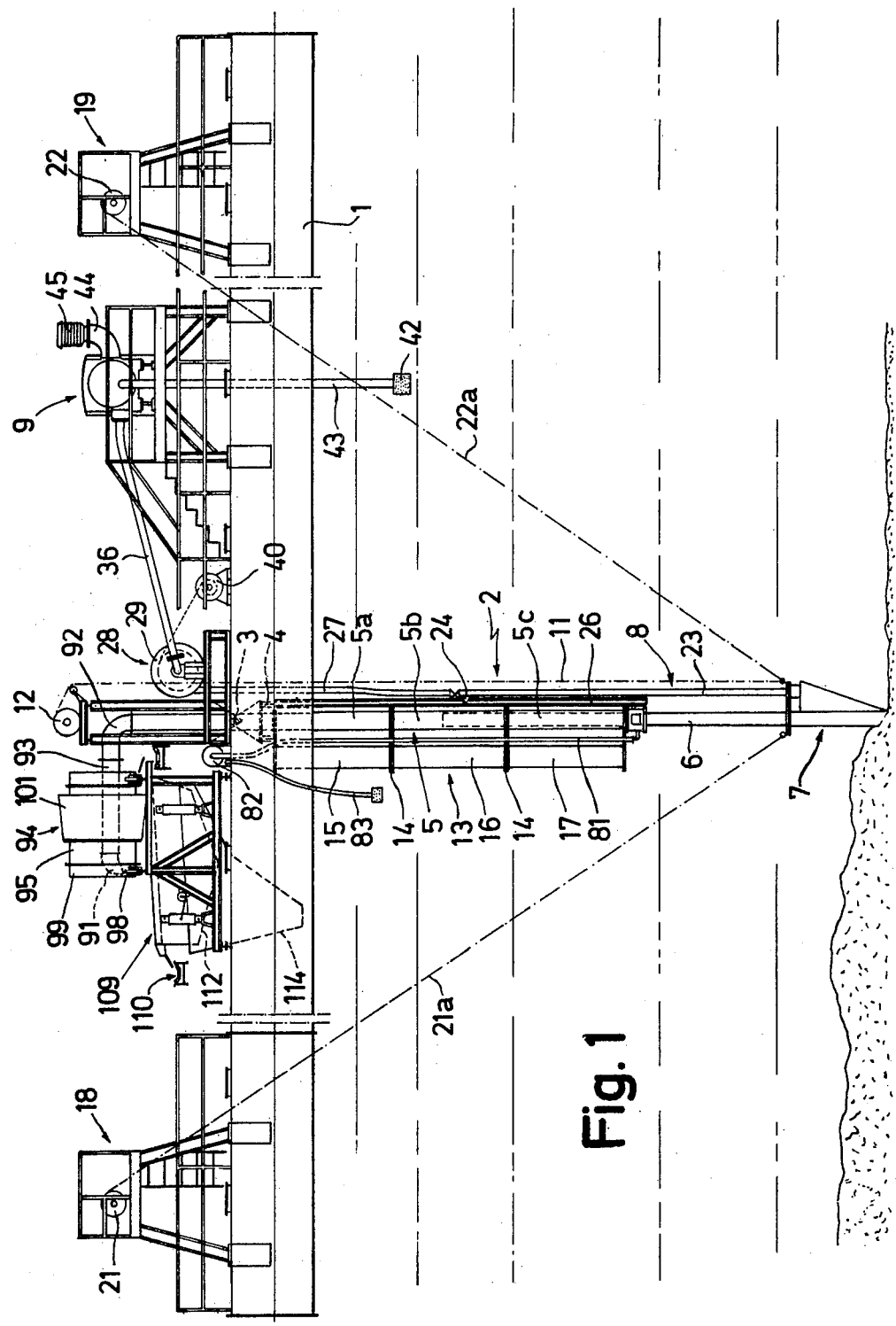
FIG. 1 is a diagrammatic side view of a preferred embodiment of the invention.

FIG. 1 is a diagrammatic overall side view of a preferred embodiment of apparatus according to the invention for conveying loose material, in this case especially sand and gravel lying under water, although the invention is also suitable in principle for dry loose material. The apparatus shown comprises a floating body 1, consisting of two hollow pontoons disposed side by side and joined by flanges. A conveyor line 2 for the loose material conveyed from the bed of a watercourse is connected to the floating body 1. It consists of an outer pipe portion 5, in which a second inner pipe portion 6 of somewhat smaller diameter is telescopically slideable. A conventional conveyor head 7 is disposed at the lower end of the inner pipe portion 6, for receiving the conveyed loose material and passing it to the conveyor line 2. It may for example comprise a box shaped housing provided with an opening at its lower end and with the conveyor line 2 being connected by flanges to its upper side. The conveyor head 7 is furthermore connected to a pressurised medium line 8. This line 8 runs, parallel to the conveyor line 2, upwards to the floating body 1, and is connected there to a pressurized medium pump 9. The pressurised medium may be for example compressed air or water. The pressurised medium is forced by the pump 9 through the line 8 into the conveyor head and is introduced into this, for example, against the conveying direction. It thereby fulfills two functions, namely the disintegration of the consolidated bed and the conveying of the loose material mixed with water upwards through the conveying line 2.

The inner pipe portion 6 is slidable in the outer pipe portion 5 in the longitudinal (i.e. vertical) direction. For this purpose a cable 11 is fixed to the inner pipe portion 6 or to the conveyor head rigidly connected to it, and may be wound or unwound by a cable winch 12 disposed on the floating body 1. On winding, the inner pipe portion 6 is raised into the outer pipe portion 5, whereas on unwinding the cable 11 from the winch 12 the pipe portion 6 descends, lowered by its own weight, from the outer pipe portion 5. By this means the length of the conveyor line 2 may be varied over a wide range. Thus, for example, the outer pipe portion 5 may have a length of up to 40 meters, and the inner pipe portion 6 a similar length. In this case the length of the conveyor line 2 may be continuously adjusted for example between 40 and 80 meters.

So that the weight of the conveyor line 2, which can be of rather great total length, is not too large for its mounting on the floating body, a second pipe 13 is disposed parallel to the outer pipe portion 5, and is connected by flanges 14 to the pipe portion 5. The pipe 13 is sealed closed and is at least partly empty. It is therefore buoyant in water and so reduces the weight acting on the mounting of the conveyor line 2. The buoyancy of the pipe 13 is so selected that the major part of the weight of the conveyor line 2 is compensated for, and therefore the conveyor line 2 only acts with low weight on the mounting at the floating body 1. The pipe 13 may be subdivided into individual chambers 15, 16, 17 flange-connected with one another. In addition to reducing the effective weight of the conveyor line 2, the pipe 13 serves as a reinforcement.

Figure 2:
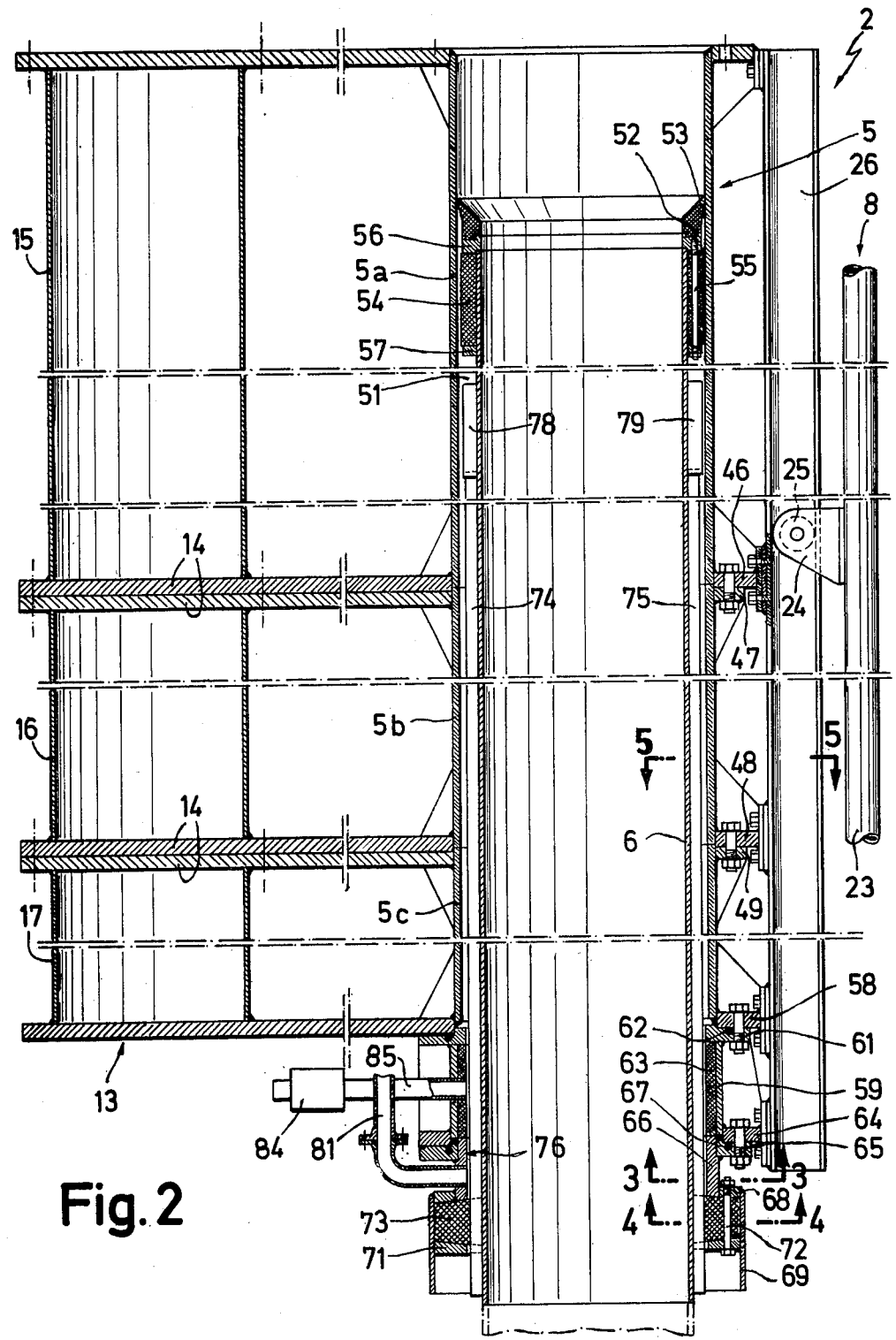
FIG. 2 is a longitudinal section through the conveyor line consisting of telescopic pipe portions.

The outer pipe portion 5, as seen in FIG. 2 consists of individual parts 5a, 5b, 5c, connected together by flanges 46, 47 and 48, 49. These flanges are formed in one piece with the flanges 14 which close the chambers 15, 16, 17, and therefore also serve as reinforcement for the pipe portion 5. The division of the outer pipe portion 5 into parts 5a,5b,5c facilitates its assembly.

Figure 6:
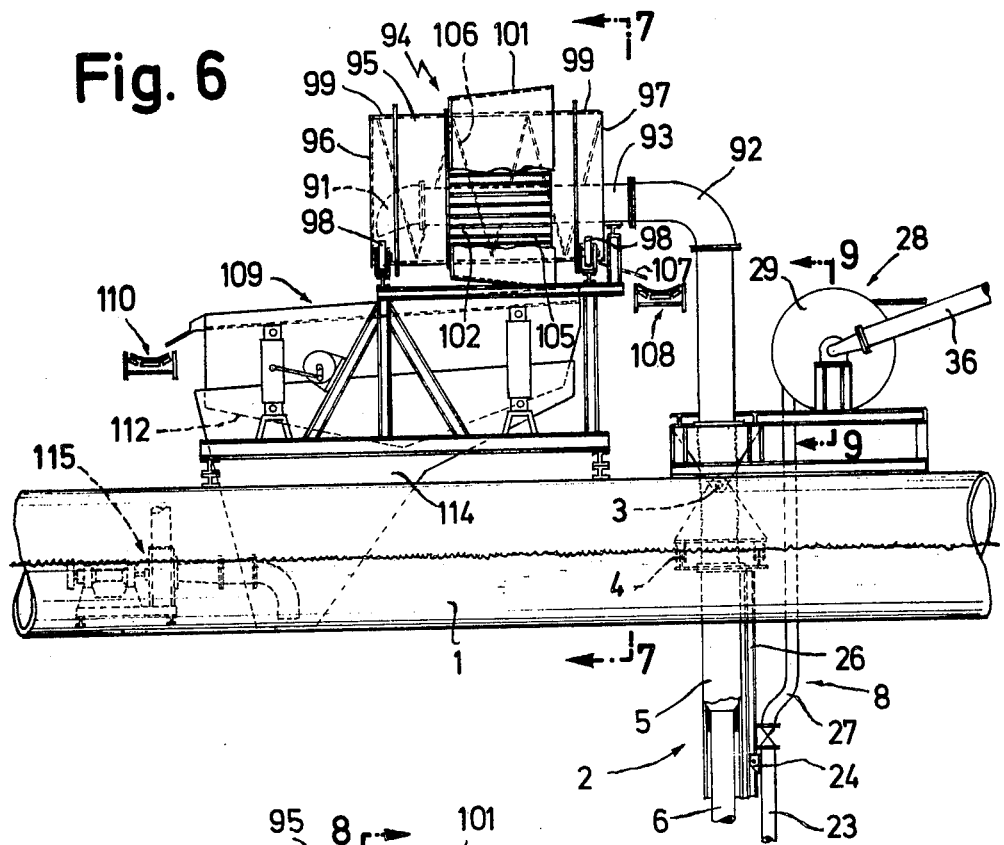
FIG. 6 is a portion of FIG. 1 to an enlarged scale.

The outer pipe portion 5 is not displaceable in its longitudinal direction at the floating body 1, but is not rigidly disposed, and is in fact pivotably supported in a known manner by two horizontal hinged bearings 3, 4 disposed at right angles to each other. The hinged bearing 3 is rotatable in the longitudinal vertical plane of the floating body 1, and the hinged bearing 4 is rotatable transversely to it (FIG. 6). The conveyor line 2 has a flexible portion in the region of the hinged bearings 3 and 4, in order to allow the conveyor line 2 to be swung about the axes of the hinged bearings 3 and 4. The conveyor line 2 may in this manner be swung forwards or backwards and also to the right or left. Two winch stands 18 and 19 on the floating body 1 are provided with cable winches 21 and 22 respectively, on each of which a cable 21a and 22a respectively, connected to the lower part of the pipe portion 6, is wound (FIG. 1). With the help of this cable winch, the conveyor line 2 may be swung about the hinged bearing 3 into an almost horizontal position, for example for transportation. This is easily possible as the effective weight of the conveyor line 2 is very small because of the buoyancy of the pipe 13.

The pressurised medium line 8 runs parallel to the conveyor line 2 from the floating body 1 to the conveyor head 7. Its lower part is in the form of a rigid pipe 23 of length corresponding approximately to the length of the inner pipe portion 6. It is provided at its upper end with a carriage 24 comprising rollers 25 (FIG. 2). An I-section rail is disposed on the outside of the outer pipe portion 5 and extends parallel to it over its entire length. The upper end of the pipe 23 is guided on the rail 26 by the rollers 25 as the inner pipe portion 6 moves in and out. A flexible line 27 is connected to the upper end of the pipe 23 and is wound on a hose reel 28 on the floating body 1. The flexible line 27 is unwound from the hose reel 28 to a greater or lesser extent according to the distance by which the inner pipe portion 6 projects from the outer pipe portion 5 and correspondingly the depth at which the upper end of the pipe 23 is positioned.

Figure 9:
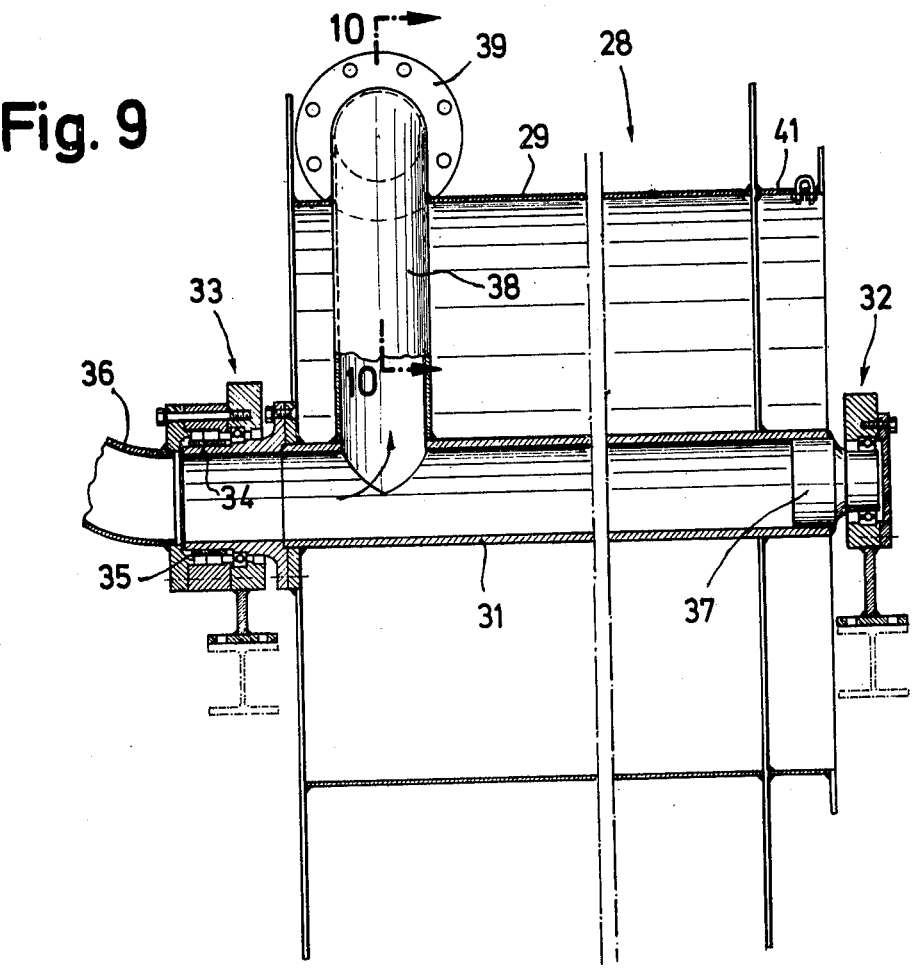
FIG. 9 is a partly sectional view of a hose reel taken on the line 9—9 of FIG. 6.
Figure 10:
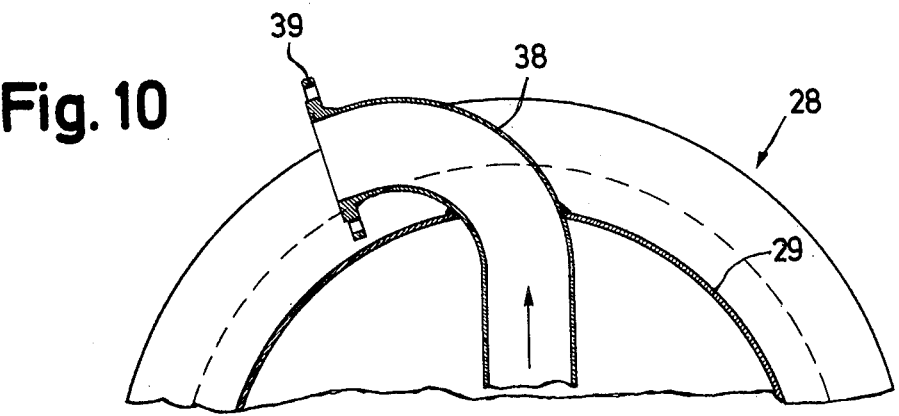
FIG. 10 is a sectional view on the line 10—10 of FIG. 9.

The hose reel 28 consists of a horizontally supported reel 29 (FIGS. 9 and 10) with a hollow axle 31. It is supported in two pivot bearings 32 and 33, and is sealed on one side with a packing washer 34 against a stationary gasket 35. On this side the axle 31 is connected through a feed line 36 to the pressurised medium pump 9, and on the other side it is closed by a closing piece 37 which simultaneously serves as a trunnion. The hollow axle 31 is also connected to a radial pipe 38 leading to the surface of the reel 29. The pipe 38 is bent tangential to the reel surface at its exit from the latter and comprises at its end a flange 39 to which the flexible pressurised medium line 27 is attached. The line 27 may be wound onto the reel 29 by rotating the latter, and always remains connected by way of the hose 38 and hollow axle 31 with the feed line 36 leading to the pressurised medium pump 9.

The reel 29 may be driven, for example, directly by the cable 11 which serves for raising and lifting the inner pipe portion 6. It can however, instead be driven by a cable wound on a pulley 41 disposed next to the reel 29 and wound or unwound by a winch 40.

The winding or unwinding takes place in any case in such a manner that the flexible line 27 is always wound or unwound by the reel 29 with the same velocity as that with which the inner pipe portion 6 moves out or in.

Air or water, for example, used as pressurised medium, is fed by the pump 9 into the conveyor head 7. For the intake of water, the pump 9 is connected to a water intake line 43 provided with a mesh filter 42, and which draws the water from the lake or river and delivers it to the pump. A pipe 44 is provided for air intake through an air filter 45 (FIG. 1).

FIG. 2 shows the telescopic pipe portions 5 and 6 on a larger scale. The diameter of the inner pipe portion 6 is so chosen that an annular interspace 51 remains free between the pipe portion 5 and pipe portion 6. The inner pipe portion 6 is at its upper end provided with a sleeve 52 preferably formed from an elastic material, comprising an annular seal lip 53 resting on the inner wall of the outer pipe portion 5, which lip closes the top of the annular interspace 51. Below the sleeve 52 is disposed a guide element of elastic material, in particular a guide ring 54, which serves for guiding the inner pipe portion 6 in the outer pipe portion 5. The ring 54 is held by bolts 55 between two metal rings 56 and 57, which likewise encircle the inner pipe portion 6. The outer diameter of the guide ring 54 is slightly smaller than the inner diameter of the outer pipe portion 5.

The outer pipe portion 5 is encircled at its lower end by a flange 58; a further short pipe portion 59 provided with a flange 61 is attached to the flange 58. Between the two flanges 58 and 61 is provided an annular gasket 62. The pipe portion 59 is of metal, as is the pipe portion 5, and is of slightly larger diameter than the latter. A further guide ring 63 is disposed at the inner wall of the pipe portion 59 and has an inner diameter slightly larger than the outer diameter of the inner pipe portion 6. It is preferably formed from an elastic material.

The inner pipe portion 6 is guided in the outer pipe portion 5 through the guide ring 54 on the upper side of the inner pipe portion 6 and the guide ring 63 on the lower side of the outer pipe portion 5; this arrangement prevents jamming of the inner pipe portion 6 in the outer pipe portion 5.

The short pipe portion 59 carries at its lower end a flange 64 to which a further short pipe portion 66 is attached by a flange 65. An annular gasket 67 is disposed between the two flanges 64 and 65. The pipe portion 66 is of metal, and its inner diameter is slightly larger than the outer diameter of the inner pipe portion 6, but smaller than the inner diameter of the outer pipe portion 5.

At its lower end, the pipe portion 66 comprises a flange 68 to the outside of which is fixed a short, downwardly directed metal cylinder 69. A wide annular sealing sleeve 73 of elastic material is compressed inside the cylinder 69 between the flange 68 and a metal ring 71 by bolts 72. Its outside lies firm against the metal cylinder 69, and its inside firm against the outer diameter of the inner pipe portion 6. The annular interspace 51 between the pipe portion 5 and pipe portion 6 is sealed at its lower end by this sleeve 73.

Figure 3:
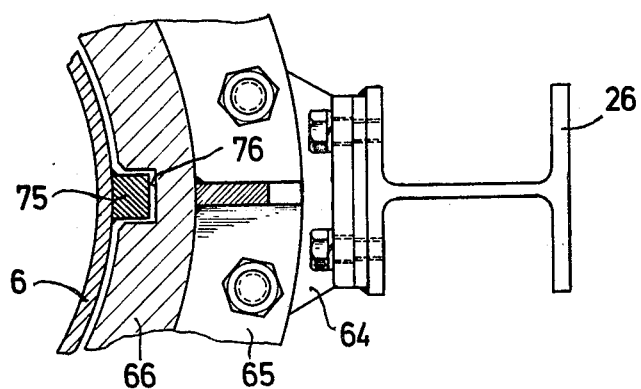
FIG. 3 is a partial section on the line 3—3 of FIG. 2.
Figure 4:
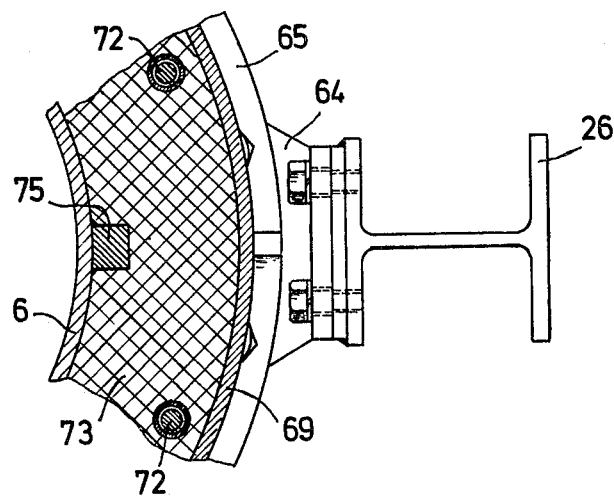
FIG. 4 is a sectional view analogous to FIG. 3 on the line 4—4 of FIG. 2.
Figure 5:
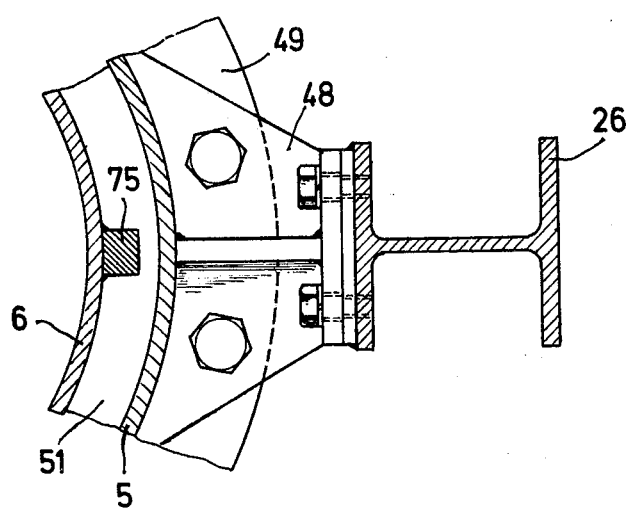
FIG. 5 is a sectional view on the line 5—5 of FIG. 2.

The inner pipe portion 6 is prevented from twisting by two opposing guide bars 74 and 75 disposed on its outside and extending substantially over its entire length. They are guided in longitudinal grooves 76 formed in the thick metal wall of the pipe portion 66 (FIG. 3). The guide bars 74 and 75 are prevented from jamming in the grooves 76 by providing a clearance between each groove and guide bar. The elastic guide ring 63 also comprises corresponding grooves formed in such a manner that a clearance exists between a groove and guide bar. The sealing sleeve 73 also comprises corresponding grooves (FIG. 4); they fit tight against the guide bars 74 and 75, however, in order to seal the interspace 51. At the upper ends of the guide bars 74 and 75, directly below the guide ring 54, are disposed two stop pieces 78 and 79 which rest, for example, on the flange 61 when the inner pipe portion 6 is lowered, and so prevent the inner pipe portion 6 from completely sliding out of the outer pipe portion 5 downwards.

The interspace 51 between the inner pipe portion 6 and the outer pipe portion 5 is filled with a pressurised sealing medium, preferably water. This sealing medium is fed through a sealing medium line 81 into the interspace 51 directly above the sealing sleeve 73. The line 81 is connected to a sealing medium pump 82 on the floating body 1. This draws in water through a line 83 and conveys it under pressure into the interspace 51.

The sealing medium fills the entire interspace 51 and serves as a lubricant between the guide rings 54, 63 and pipe portions 5,6. It also prevents the penetration of sand, gravel or other impurities into the interspace 51 because its pressure exceeds the ambient pressure. The sleeve 53 is disposed at the upper end of the inner pipe portion 6 is so formed that the sealing medium can leak out between the seal lip 53 and inner wall of the outer pipe portion 5 to a very slight degree. This ensures that sand and stones will be washed away by the sealing medium, for example on retraction of the inner pipe portion 6, and cannot remain between the seal lip 53 and the wall of the outer pipe portion 5.

A relief line 85 fitted with a pressure relief valve 84 is provided in the lower part of the outer pipe portion 5, for example in the pipe portion 59, in order to lead away the excess sealing medium when the inner pipe portion 6 slides out, on which the interspace 51 becomes smaller. When the inner pipe portion 6 slides out, the pressure of the sealing medium rises until the valve 84 opens and the excess sealing medium flows outwards through the relief line 85. When the inner pipe portion 6 slides inwards, further sealing medium is pumped by the pump 82 through the line 81 into the interspace 51.

The pump 82 is arranged, in known manner, so that it is automatically switched off when a certain pressure is reached in the interspace 51 and is switched on again when the pressure of the sealing medium falls to a certain value.

The described embodiment of the invention is not the only possible realisation of the inventive idea, other embodiments also being possible.

The cross-section of the telescopic pipe portions 5 and 6 may be circular, oval, triangular, square or polygonal. By the use of a non-circular cross-section increased stability of form of the pipe portions 5 and 6 can be attained. Moreover, the inner pipe portion 6 would be automatically protected against twisting about its longitudinal axis in the outer pipe portion 5; the guide bars 74 and 75 and grooves 76 could therefore be dispensed with.

The pressurised medium line 8 need not be rigidly constructed and guided by a carriage 24 on the rail 26. It is also not absolutely necessary to provide the pipe 13 which serves as a buoyancy body and stiffener; in the case of a short conveyor pipe 2, this may be The with. The outward movement of the inner pipe portion 6 may be performed by a hydraulic or pneumatic piston and cylinder actuating means instead of the cable 11 and winch 12, especially if the pipe portion 6 is short. Another possible drive method for the inner pipe portion consists of forming the guide bars 74, 75 as racks, which mesh with gearwheels supported on the outside of the pipe portion 5, and driven by a motor, firmly fixed to the outer pipe portion 5, possibly through a gear unit.

More than two telescopic pipe portions may be used to form the conveyor line 2, for example in the case of a long conveyor line. The important consideration is that the working length of the conveyor pipe 2 must be continuously adjustable by means of the telescopically arranged pipe portions, and the interspace between the pipe portions must be filled with a pressurised medium serving as a sealing medium, so that penetration of impurities, such as sand and gravel, between the pipe portions is prevented.

Since the working depth of the conveyor pipe 2 is continuously adjustable by sliding inwards or outwards one or more pipe portions, the upper conveyor pipe end may be supported in a substantially stationary manner. This makes it possible to use a simple impingement vessel for braking the conveyed loose material. In particular this vessel can be of considerably lower construction and needs no vertical feed slot, as is necessary in the case of conveyor apparatus in which the upper conveyor pipe end is vertically adjustable.

Figure 7:
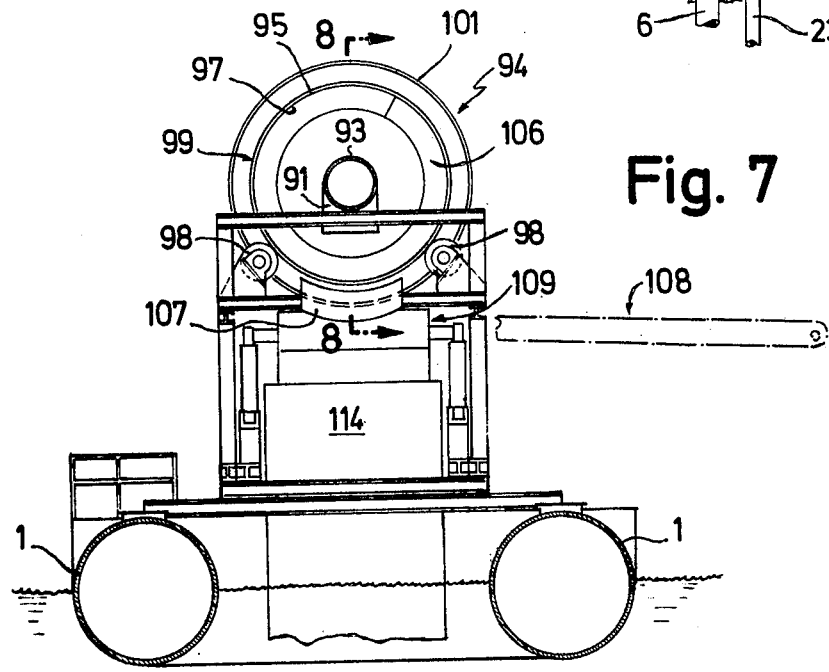
FIG. 7 is a section on the line 7—7 of FIG. 6.
Figure 8:
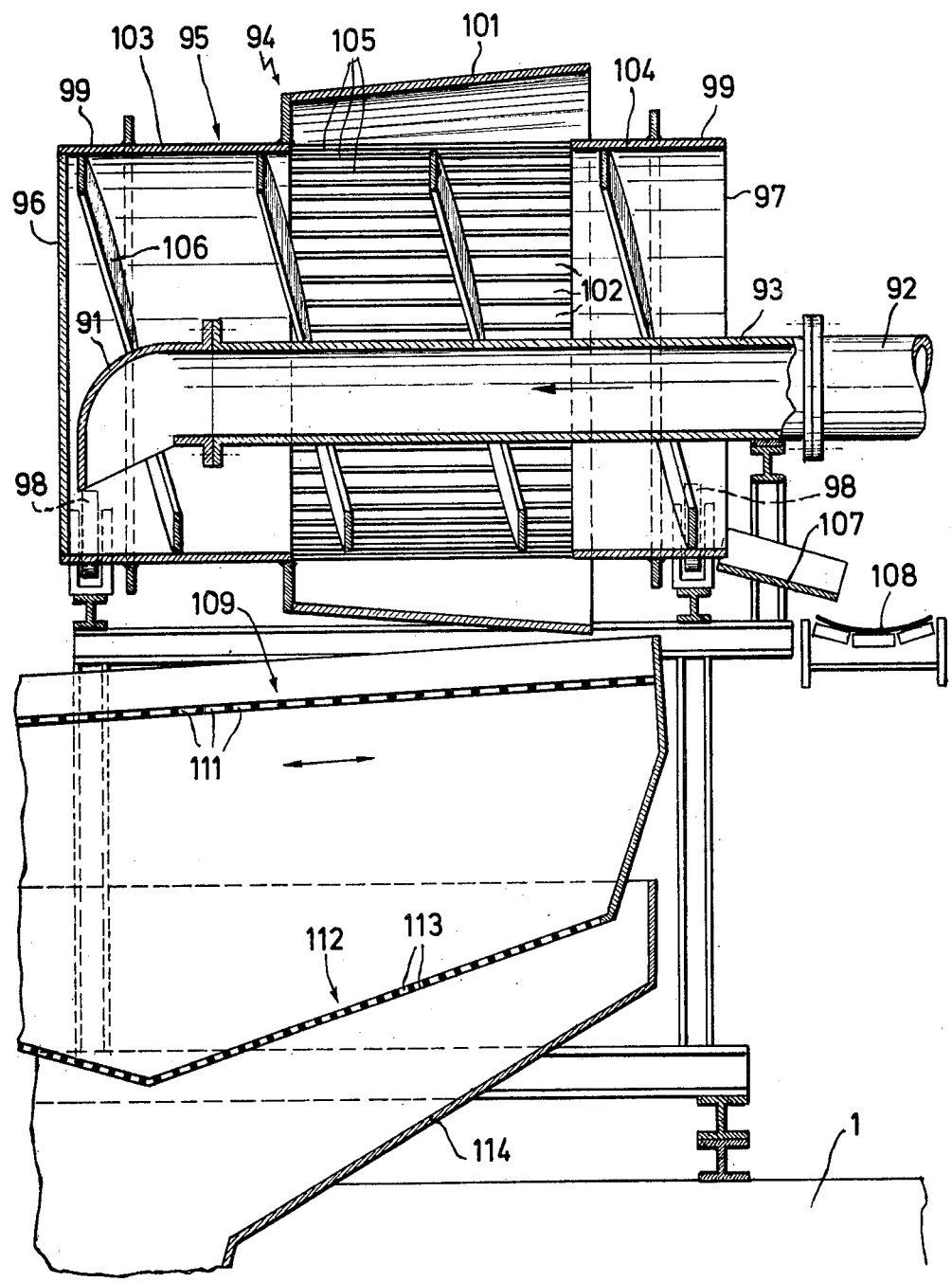
FIG. 8 is a section on the line 8—8 of FIG. 7.

One particular embodiment of the impingement vessel is shown in FIGS. 6 to 8. It comprises a simple impingement head 91, disposed at the end of a horizontal pipe 93 connected through an elbow 92 to the upper end of the conveyor line 2. The impingement head 91 consists substantially of a downwardly directed pipe elbow, open downwards. The loose material, mixed with water, which has been pushed upwards by the pressurised medium through the conveyor line 2 is braked in the elbow 92 and impingement head 91.

This simple horizontal impingement vessel arrangement allows the relatively small impingement head 91 to be combined with a classifying drum 94 for sorting the loose material into various sizes. The drum 94 consists of a horizontally supported revolving screen drum 95 with one open end 97 and one closed end 96, supported on rollers 98 rotatably supported parallel to the axis of the drum, which rollers roll on the outer jacket 99 of the drum 95 somewhat above the drum bottom. The middle portion of the screen drum 95 is encircled by a frustum shaped drum 101, the smaller diameter of which is larger than the diameter of the screen drum 95. The drum 101 is firmly connected at its smaller-diameter end to the screen drum 95, so that it is closed at that end. It is however open at the other end, facing the open end 97 of the screen drum 95. The screen drum 95 has openings 102 in the zone covered by the drum 101; these may for example be formed by making the screen drum 95 in two parts 103 and 104, held together by horizontal rods 105. The spaces between the rods 105 then form the openings 102.

The horizontal pipe 93, to which the impingement head 91 is fixed, is inserted coaxially into the rotating screen drum 95. The conveyed loose material falls from the impingement head onto the inner surface of the screen drum 95. The loose material is conveyed towards the open end 97 of the screen drum 95 by a screw conveyor 106 disposed inside the screen drum 95 and encircling the pipe 93 and impingement head 91. When loose material is being pushed over the openings 102, material of sizes smaller than the openings 102 falls through these into the surrounding drum 101. Only large stones remain in the screen drum 95, and are further conveyed by the screw conveyor 106 to the open end 97 of the screen drum 96. There they fall through a chute 107 onto a conveyor belt 108 and are further conveyed to a storage bin. The smaller material including sand and water slides to the open end of the drum 101 and falls out of it. It may fall in known manner on to an inclined vibrating screen 109, provided with openings 111 which are smaller than the openings 102 in the screen drum 95. The vibrating movement of the vibrating screen 109 causes the finer material to fall through the openings 111, for example on to a further vibrating screen 112 with still smaller openings 113. Stones of middle size then remain on the vibrating screen 109, and are conveyed by the vibrating movement of the inclined vibrating screen 109 onto a conveyor belt 110 and into a corresponding storage bin. Likewise fine gravel for example is collected on the vibrating screen 112, and is likewise fed to a bin. A container 114 may be disposed under the vibrating sieves to serve as a sump, in which the mixture of sand and water which has fallen through all openings 102, 111 and 113 is collected. A separator pump 115 separates the sand from the water in known manner; the sand is fed to a storage bin and the water is pumped back into the lake or river. The screen drum 95 need not always be rotated, as the loose material may also be transported by simply vibrating the screen drum.

The screen drum 95 may be surrounded not only by one drum 101, but by a further drum disposed coaxially surrounding the drum 101. The outer surface of the drum 101 is then provided in the region of its surrounding drum with openings in a similar manner to the screen drum 95, which openings are smaller than the openings 102. In this manner multiple rather than a double screening of the loose material is possible.

The use of the described classifier comprising a rotating screen drum with one or more surrounding drums is particularly advantageous when used in connection with the apparatus according to the invention for conveying loose material, because a stationary horizontal impingement head system can be introduced into the interior of the classifier because of the fixed level of the conveyor line 2. Naturally, this combination of a horizontal impingement head and a horizontal revolving drum classifier may also be used in other conveyor apparatus into which a stationary impingement head can be inserted. This is, for example, always the case when the upper end of the conveyor line is not adjustable in level.

I claim:

1. In an apparatus for conveying loose material, a combination comprising a substantially vertically extending conveyor line including at least an upper outer pipe which is immovable in the axial direction thereof, and a lower inner pipe surrounded by said upper outer pipe and being extendable and retractable relative thereto, said pipes having respective telescoped-together portions which bound an annular interspace with one another; sealing means for sealingly closing longitudinally spaced end regions of said interspace, including an upper sealing sleeve disposed at the upper end of said lower inner pipe and having an elastically deflectable sealing lip which is pressed against the inner surface of said upper outer pipe with a predetermined force; and means for maintaining a fluid seal in said interspace, including a sealing medium feedline communicating with said interspace in the region of the lower end of said upper outer pipe, and a sealing medium pump communicating with said sealing medium feed line and feeding said sealing medium into said interspace at an elevated pressure sufficient to overcome said predetermined force with which said sealing lip is pressed against said inner surface of said outer pipe, so that said sealing medium deflects said sealing lip and flows past the same out of said interspace to thereby prevent contaminants from entering said interspace past said sealing means even during said relative extension and retraction of said lower inner pipe resulting in decreasing and increasing of said interspace.

2. Apparatus as claimed in claim 1, including guide elements disposed at the upper end of said inner pipe portion and at the lower end of said outer pipe for guiding said inner pipe in said outer pipe.

3. Apparatus as claimed in claim 1, comprising a relief line with a pressure relief valve in the region of the lower end of the upper pipe for discharging excess sealing medium from the interspace.

4. Apparatus as claimed in claim 1, comprising a sealed pipe serving as a buoyant body and rigidly connected to the conveyor line parallel to it.

5. Apparatus as claimed in claim 4, wherein the sealed pipe consists of individual chambers.

6. Apparatus as claimed in claim 1 including a double hinged bearing supporting the upper end of the upper pipe for pivoting about mutually perpendicular axes.

7. Apparatus as claimed in claim 6 in which the conveyor line is flexible in the region of the said bearing.

8. Apparatus as claimed in claim 1 comprising a conveyor head disposed at the lower end of said lower pipe.

9. Apparatus as claimed in claim 8, comprising a pressurized medium line extending parallel to said conveyor line to said conveyor head.

10. Apparatus as claimed in claim 9, comprising a guide rail for the pressurized medium line to the conveyor head parallel to the conveyor line, on the outer pipe and extending substantially over its entire length.

11. Apparatus as claimed in claim 9, wherein at least the upper portion of the pressurized medium line is flexible.

12. Apparatus as claimed in claim 11, including a reel whereon the flexible portion of the pressurized medium line is windable, and a feed line connecting said flexible portion to a pressurized medium pump.

13. Apparatus as claimed in claim 12, wherein the reel comprises a hollow axle closed at one end, connected at one end to the feed line and at the other end through a radially outwardly directed hose to the flexible portion of the pressurized medium line.

14. Apparatus as claimed in claim 1 wherein the pipes are of circular cross section.

15. Apparatus as claimed in claim 1 wherein the pipes are of non-circular cross section.

16. Apparatus as claimed in claim 1, in which at least one pipe is provided with longitudinal stiffening means.

17. Apparatus as claimed in claim 16 in which the stiffening means comprise guide bars extending along said inner pipe and engaging longitudinal grooves in said outer pipe.

18. Apparatus as claimed in claim 1, comprising stop pieces at the upper end of said lower pipe and a stop provided at the lower end of said upper pipe and cooperating with said stop pieces to prevent excessive downward movement of said lower pipe.

19. Apparatus as claimed in claim 1, comprising an impingement head; and means for connecting the conveyor line at its upper end to said impingement head, including an elbow and a substantially horizontal pipe.

20. Apparatus as claimed in claim 19, wherein the impingement head includes a pipe elbow directed downwards and open downwards.

21. Apparatus as claimed in claim 19, further including a classifying drum and rotatable about a horizontal axis wherein the impingement head is disposed in the interior of said classifying drum.

22. Apparatus as claimed in claim 21, wherein the classifying drum includes a screen drum with openings in an outer shell thereof so that the smaller constituent parts of the conveyed loose material fall through said openings while the larger constituent parts remain in the interior of the screen drum.

23. Apparatus as claimed in claim 22, comprising a screw conveyor disposed in the interior of the screen drum for transporting the loose material along the drum.

24. Apparatus as claimed in claim 22, comprising a frustum-shaped drum joined in a sealed manner at its smaller diameter end to the shell of the screen drum and open at its other end and coaxially surrounding the screen drum about a zone in its outer shell which comprises the openings.

25. In an apparatus for conveying loose material, a combination comprising a conveyor line extending substantially vertically and including at least an upper outer pipe which is stationary in the axial direction thereof, and a lower inner pipe partially telescopically received within and surrounded by said upper outer pipe so that respective telescoped-together portions of said pipes circumferentially bound an interspace, said pipes having respective end regions at said portions; means for preventing excessive downward telescoping movement of said lower pipe relative to said upper pipe, including stop pieces at the upper end of said lower pipe, and a stop at the lower end of said upper pipe, said stop pieces and said stop abutting one another when said lower pipe is telescoped to the permissible extent out of said upper pipe; means for guiding said lower pipe in said upper pipe during the telescoping thereof, including guide elements disposed at the upper end of said lower pipe and at the lower end of said upper pipe; means for stiffening at least said lower pipe, including guide bars extending along said lower pipe, and longitudinal grooves in said upper pipe and receiving said guide bars; sealing means connected to said end region of each of said pipes and in sealing contact with said portion of the respective other pipe, including an upper sealing sleeve disposed at the upper end of said lower pipe and having an elastically deflectable sealing lip which is pressed against an inner surface of said portion of said upper pipe with a predetermined force, said sealing means longitudinally bounding said interspace the volume of which varies in dependence on the extent of telescoping of said lower pipe relative to said upper pipe; and means for maintaining a fluid seal at elevated pressure in said interspace to thereby prevent contaminants from entering said interspace past said sealing means even during the telescoping of said lower pipe relative to said upper pipe, including a sealing medium pump, a sealing medium feed line communicating said sealing medium pump with said interspace in the region of the lower end of said upper pipe, a relief line communicating with said interspace in the region of the lower end of said upper pipe and operative for discharging excess sealing medium from said interspace, and a pressure relief valve interposed in said pressure relief line, said sealing medium pump and said pressure relief valve determining the pressure of said sealing medium in said interspace and continuously keeping such pressure at a value which is sufficient to overcome said predetermined force at which said sealing lip is pressed against said inner surface of said outer pipe, so that said sealing medium of said fluid seal deflects said sealing lip from said inner surface of said portion of said upper pipe to escape past the same and thereby remove the contaminants from the vicinity of said upper sealing sleeve.

* * * * *